United States Patent
Line et al.

(10) Patent No.: US 11,377,000 B2
(45) Date of Patent: Jul. 5, 2022

(54) SUPPORT MECHANISM FOR SEATING ASSEMBLY

(71) Applicant: Ford Global Technologies, LLC, Dearborn, MI (US)

(72) Inventors: Johnathan Andrew Line, Northville, MI (US); Macit Aktas, Windsor (CA); Joseph Michael Kish, Canton, MI (US); Spencer Robert Hoernke, Dundas (CA); Jason Matthew Koberstein, Troy, MI (US); Anna Hendrickson, Royal Oak, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 17/063,326

(22) Filed: Oct. 5, 2020

(65) Prior Publication Data
US 2022/0105838 A1  Apr. 7, 2022

(51) Int. Cl.
*B60N 2/30* (2006.01)
*B60N 2/32* (2006.01)

(52) U.S. Cl.
CPC .......... *B60N 2/3093* (2013.01); *B60N 2/309* (2013.01); *B60N 2/3009* (2013.01); *B60N 2/3045* (2013.01); *B60N 2/32* (2013.01)

(58) Field of Classification Search
CPC .. B60N 2/3009; B60N 2/3045; B60N 2/3065; B60N 2/3011; B60N 2/3093
See application file for complete search history.

(56) References Cited

U.S. PATENT DOCUMENTS

| | | | |
|---|---|---|---|
| 4,884,843 A | 12/1989 | DeRees | |
| 5,924,668 A * | 7/1999 | Garrido | B60N 2/1803 248/419 |
| 6,079,763 A * | 6/2000 | Clemente | B60N 2/3011 296/65.09 |
| 6,502,798 B1 * | 1/2003 | Frohnhaus | B60N 2/165 248/421 |
| 6,578,919 B2 * | 6/2003 | Seibold | B60N 2/206 296/65.09 |
| 7,040,684 B2 * | 5/2006 | Tame | B60N 2/309 296/65.09 |
| 8,016,354 B2 | 9/2011 | Veluswamy et al. | |
| 8,616,645 B2 * | 12/2013 | Ito | B60N 2/1842 297/344.17 |

(Continued)

*Primary Examiner* — Sarah B McPartlin
(74) *Attorney, Agent, or Firm* — Vichit Chea; Price Heneveld LLP (57) ABSTRACT

A support mechanism for a vehicle seating assembly includes a seat frame moveable between a sitting position and a standing position and a support bracket coupled to a vehicle floor. A linkage assembly extends between the support bracket and the seat frame. The linkage assembly is positionable between a collapsed position if the seat frame is in the sitting position and an extended position if the seat frame is in the standing position and includes a first end rotatably coupled to the support bracket and a second end slidably coupled to the seat frame. A pawl assembly is engageable with the linkage assembly and positionable in an unlocked position if the linkage assembly is in the collapsed position and a locked position if the linkage assembly is in the extended position.

15 Claims, 9 Drawing Sheets

(56) References Cited

U.S. PATENT DOCUMENTS

| | | |
|---|---|---|
| 9,827,879 B2 | 11/2017 | Fujita et al. |
| 2006/0131946 A1 | 6/2006 | Andrigo et al. |
| 2009/0230744 A1 | 9/2009 | Szybisty et al. |

* cited by examiner

SUPPORT MECHANISM FOR SEATING ASSEMBLY

FIELD OF THE DISCLOSURE

The present disclosure generally relates to a vehicle seating assembly, and more specifically to a vehicle seating assembly that may be arranged in different positions.

BACKGROUND OF THE DISCLOSURE

A vehicle seating assembly may have features that allow the vehicle seating assembly to be arranged in different positions.

SUMMARY OF THE DISCLOSURE

According to one aspect of the present disclosure, a support mechanism for a vehicle seat includes a seat frame moveable between a sitting position and a standing position and a support bracket coupled to a vehicle floor. A linkage assembly extends between the support bracket and the seat frame. The linkage assembly is positionable between a collapsed position if the seat frame is in the sitting position and an extended position if the seat frame is in the standing position and includes a first end rotatably coupled to the support bracket and a second end slidably coupled to the seat frame. A pawl assembly is engageable with the linkage assembly and positionable in an unlocked position if the linkage assembly is in the collapsed position and a locked position if the linkage assembly is in the extended position.

Embodiments of the first aspect of the disclosure can include any one or a combination of the following features:
- a lift mechanism coupled to the vehicle floor and the seat frame and disposed on an opposing side of the vehicle seating assembly from the support mechanism, wherein the lift mechanism is configured to move the seat frame between the sitting position and the standing position;
- the second end of the linkage assembly, slidably coupled to the seat frame, includes a link arm, a slot, and a drive pin;
- the slot is disposed in the link arm and the drive pin extends from the seat frame;
- if the linkage assembly is in the collapsed position, then the drive pin is disposed in the first end of the slot, and if the linkage assembly is in the extended position, then the drive pin is disposed in the second end of the slot;
- the pawl assembly includes a pawl and a cam;
- the pawl assembly further includes a cover plate that secures the pawl and the cam to the support bracket such that the support bracket is disposed between the link arm and the cover plate;
- the pawl includes an oblong portion having a hook and a nub, wherein the link arm includes a protrusion, and wherein the protrusion is positioned along an edge of the oblong portion if the linkage assembly is in the collapsed portion or an intermediate position between the collapsed position and the extended position;
- the protrusion is positioned in the hook if the linkage assembly is in the extended position;
- the cam is spring-loaded so that, when the protrusion is positioned in the hook, the cam abuts the nub in a locked position to maintain the protrusion in the hook;
- a release mechanism coupled to the cover plate, wherein the release mechanism exerts a force on a cable pin extending into the cam to release the cam from the locked position;
- the release mechanism may be activated simultaneously with a lift mechanism release to move the seating assembly from the standing position to the sitting position; and
- the support mechanism and the lift mechanism are coupled to rails disposed in a track assembly disposed in a vehicle floor so that the vehicle seating assembly in the standing position is slidable along the track assembly.

According to a second aspect of the present disclosure, a vehicle seating assembly includes a mounting bracket coupled to a vehicle floor. A side bracket coupled to the mounting bracket at a first pivotable coupling is defined by a first axis and is rotatable about the first pivotable coupling between a sitting position and a standing position. A support bracket is coupled to the vehicle floor. A linkage assembly is coupled to the support bracket at a second pivotable coupling defined by a second axis. The linkage assembly extends between the support bracket and the side bracket. The linkage assembly is slidably coupled to the side bracket, and moveable between a collapsed position if the side bracket is in the sitting position and an extended position if the side bracket is in the standing position. A pawl assembly is coupled to the support bracket, engageable with the linkage assembly, and positionable in an unlocked position when the linkage assembly is in the collapsed position and a locked position when the linkage assembly is in the extended position.

Embodiments of the second aspect of the disclosure can include any one or a combination of the following features:
- the linkage assembly includes a link arm having a slot and a drive pin extending from the side bracket and positionable in the slot, wherein the drive pin is disposed at a first end of the slot when the linkage assembly is in the collapsed position, and wherein the drive pin is disposed in a second end of the slot when the linkage assembly is in the extended position;
- the side bracket includes a first side bracket and further includes a second side bracket rotatably coupled to a mounting bracket, wherein a lift mechanism is activated to rotate the second side bracket about the first axis to move the second side bracket between the sitting position and the standing position;
- a release mechanism, wherein an exertion of force by the release mechanism on the pawl assembly releases a cam from the locked position; and
- the link arm extends along a plane transverse to the second axis, and wherein the drive pin extends along a line substantially parallel to the second axis.

According to a third aspect of the present disclosure, a vehicle seating assembly includes a seat frame with opposing first and second side brackets and a cross member extending between the first and second side brackets and defining a first axis about which the first and second side brackets rotate between a sitting position and a standing position. A lift mechanism is coupled to one of the first and second side brackets and is configured to rotate the seat frame around the first axis and between the sitting position and a standing position. A support mechanism is coupled to the other of the first and second brackets and is arrangeable in an extended position when the seat frame is in the standing position.

Embodiments of the third aspect of the disclosure can include the following feature:
- the support mechanism includes a pawl assembly disposed in a locked position to maintain the support mechanism in the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

With reference to the seating assembly 10 described below and shown in the attached figures, a seating assembly 10 may be described from the vantage point of a passenger seated in the seating assembly 10. The side of a seating assembly 10 disposed on a right side of a seated passenger may be referred to as a right side of the seating assembly 10. The side of a seating assembly 10 disposed on a left side of seated passenger may be referred to as a left side of the seating assembly 10.

Referring to FIGS. 1-16C, a support mechanism 18 for a vehicle seating assembly 10 includes a seat frame 14 movable between a sitting position I and a standing position III and a support bracket 22. The support bracket 22 is coupled to a vehicle floor 26. A linkage assembly 30 extends between the support bracket 22 and the seat frame 14. The linkage assembly 30 is positionable between a collapsed position A if the seat frame 14 is in the sitting position I and an extended position C if the seat frame 14 is in the standing position III. The linkage assembly 30 includes an end 30A rotatably coupled to the support bracket 22 and a second end 30B slidably coupled to the seat frame 14. A pawl assembly 34 is engageable with the linkage assembly 30 and positionable in an unlocked position E if the linkage assembly 30 is in the collapsed position A and a locked position F if the linkage assembly 30 is in the extended position C.

Figure 1:
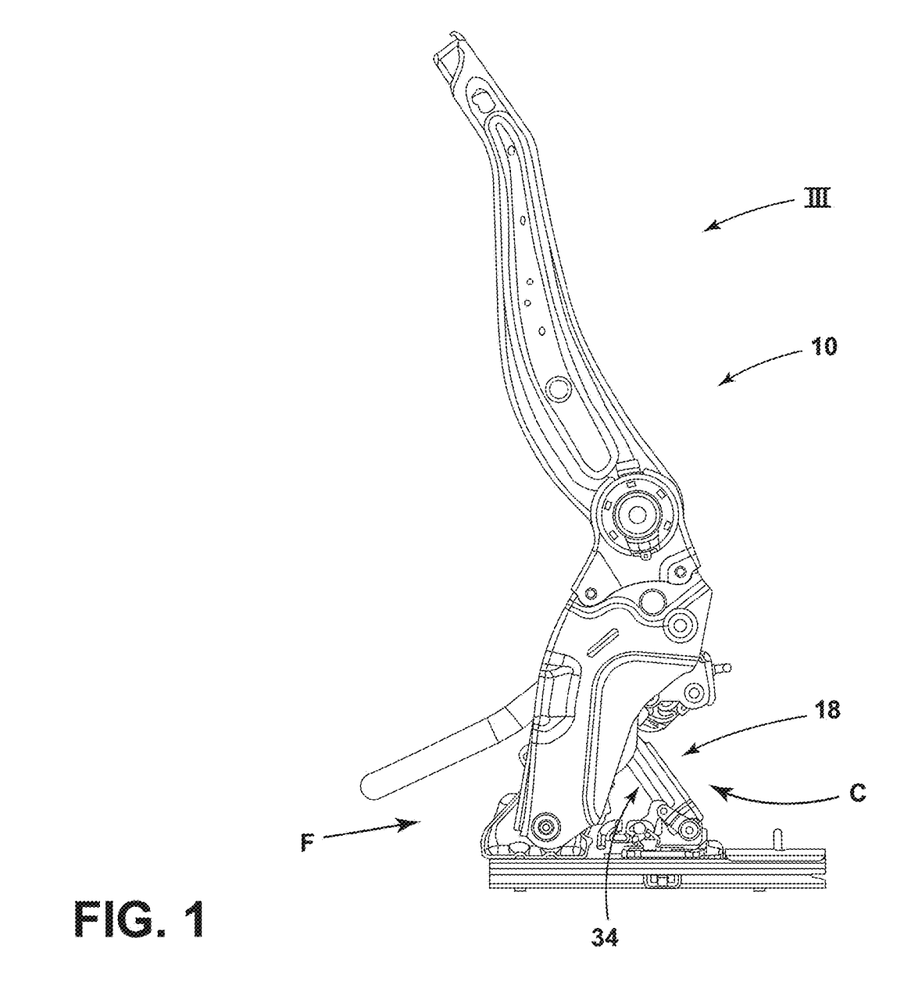
FIG. 1 is a left side elevational view of a seating assembly in a standing position and a support mechanism in an extended position.

With reference to FIG. 1, the seating assembly 10 is shown in the standing position III. The seating assembly 10 may be in the standing position III to allow passengers space for vehicle egress from an area disposed behind the seating assembly 10. The support mechanism 18 may be used to steady and stabilize the seating assembly 10 while the seating assembly 10 is in the standing position III. The support mechanism 18 is shown in the extended position C. The pawl assembly 34 is in the locked position F. The support mechanism 18 in the extended position C with the pawl assembly 34 in the locked position F may support the seating assembly 10 in the standing position III while the vehicle is at rest and in motion. The support mechanism 18 with the pawl assembly 34 in the locked position F may minimize vertical (up and down) and lateral (side-to-side) movement of the seating assembly 10 when the seating assembly 10 is in the standing position III. Additionally, a seating assembly 10 in the standing position III may be moved fore and aft in the vehicle along the track assembly 74, and the support mechanism 18 may minimize the movement of the seating assembly 10 during fore and aft movement along the track assembly 74.

When the vehicle is in motion and the support mechanism 18 is in the extended position C with the pawl assembly 34 in the locked position F, then the support mechanism 18 may support the seating assembly 10 to minimize undesirable vibrations or NVH (Noise Vibration Harshness) during vehicle movement. As such, the support mechanism 18 may allow the seating assembly 10 to achieve substantial dynamic vibration stability and utilize load floor management.

Figure 2:
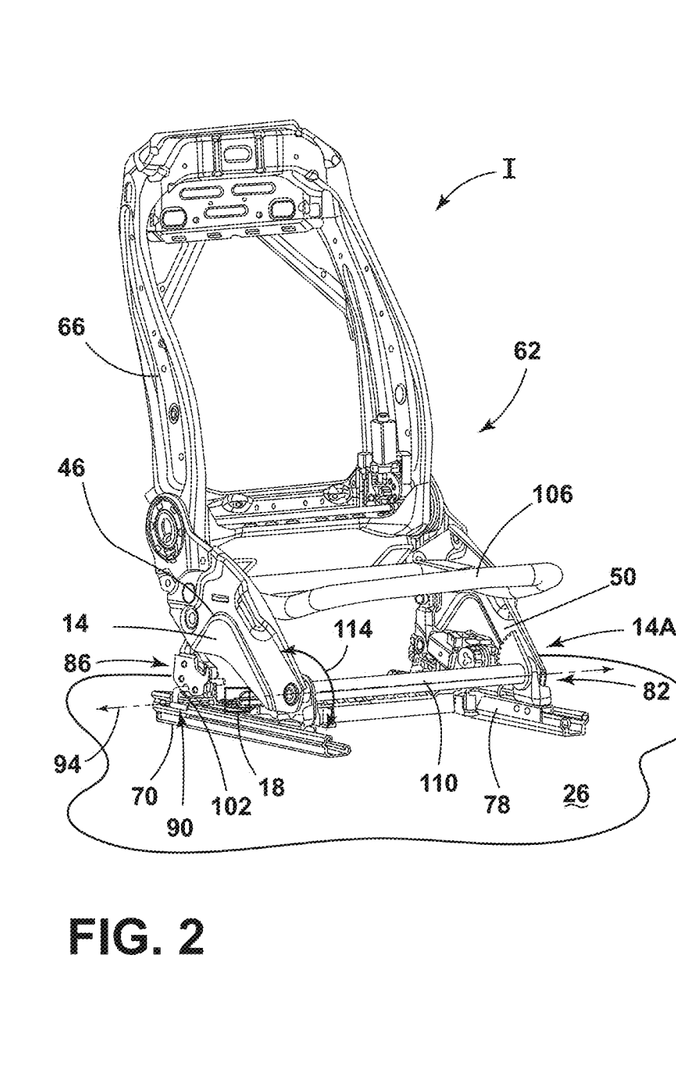
FIG. 2 is a right side perspective view of the seating assembly in the sitting position and a support mechanism in the collapsed position.
Figure 3:
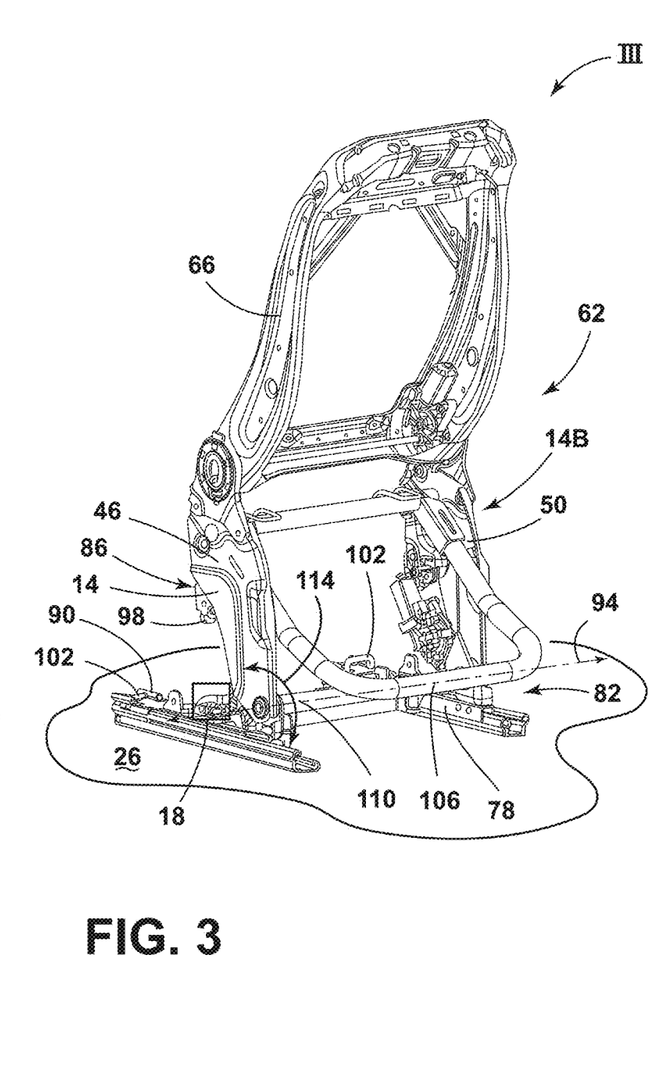
FIG. 3 is a right side perspective view of the seating assembly in the standing position and the support mechanism in the extended position.

With reference to FIGS. 2 and 3, the seating assembly frame 62 is shown in the sitting position I (FIG. 2) and the standing position III (FIG. 3). The support mechanism 18 is represented as a box in FIGS. 2 and 3. Referring now to FIG.

2, the sitting position I may also be referred to as the design position. The seating assembly frame 62 may include a seat frame 14 and a seatback frame 66. When the seating assembly 10 is in the sitting position I, the intermediate position II, or the standing position III, the seating assembly frame 62, the seat frame 14, and the seatback frame 66 may also be referred to as being in the sitting position I, the intermediate position II, or the standing position III. The seatback frame 66 may be pivotably coupled to the tracks 70 of the track assembly 74. Rails 78 may be slidable within the tracks 70. The track assembly 74 may extend along a vehicle floor 26. The track assembly 74 may be coupled to the vehicle floor 26. In the example shown, the seating assembly 10 includes a lift mechanism 82 disposed at the left side of the seating assembly 10 and the support mechanism 18 disposed at the right side of the seating assembly 10. In various examples, the seating assembly 10 may include a lift mechanism 82 disposed at the left side of the seating assembly 10 and the support mechanism 18 disposed at the right side of the seating assembly 10. The seating assembly 10 may include a pair of latch assemblies 86 disposed at the rear portion 14B of the seat frame 14. The pair of latch assemblies 86 may be disposed on the left and right sides of the seating assembly 10. The latch assemblies 86 may be detachable from the mount assemblies 90 disposed on, in, or proximate the rails 78 to pivot the seat frame 14 about an axis 94 defined by the lift mechanism 82 disposed at the forward portion 14A of the seat frame 14. In the example shown, the axis 94 may be further defined by the cross member 110. The latch assemblies 86 may include a latching claw 98. The mount assemblies 90 may include strikers 102. The seating assembly frame 62 may include side brackets (right side bracket 46, left side bracket 50) disposed on opposing sides of the seat frame 14. The seating assembly 10 may also include a carrier 106 extending away from the seat frame 14. The carrier 106 may be a cantilevered member. The carrier 106 may support a seat pan and/or a seat cushion.

Referring to FIG. 3, the seating assembly 10 is shown in a standing position III. The rear portion 14B of the seat frame 14 is shown released from the mount assemblies 90. The lift mechanism 82 may be activated by power actuation or manual actuation to move the seating assembly 10 between the sitting position I and the standing position III.

With continued reference to FIG. 3, power actuation of the seating assembly 10 may occur when a power actuator moves the seating assembly 10 in response to an input. During power actuation, a power actuator, such as a motor, may be used to release the latch assemblies 86 from the mount assemblies 90 and to move the seating assembly 10 between the sitting position I and the standing position III and intermediate positions II (FIGS. 7A, 7B, 10A, 10B) between the sitting position I and the standing position III. The seating assembly 10 may rotate about the axis 94 in the directions shown by arrow 114 to move between the sitting position I and the standing position III.

With continued reference to FIG. 3, manual actuation of the lift mechanism 82 to move the seating assembly 10 from the sitting position I to the standing position III may occur when a passenger exerts a manual force to release the latch assemblies 86 from the mount assemblies 90 and to move the seating assembly 10 from the sitting position I to the standing position III. The passenger may exert a force on the seating assembly 10 in the standing position III to move the seating assembly 10 from the standing position III to the sitting position I. The latching claws 98 of the latch assemblies 86 may engage the strikers 102 of the mount assemblies 90 as the seating assembly 10 is returned to the sitting position I from the standing position III.

During powered and manual movements of the seating assembly 10 from the sitting position I to the standing position III, the lift mechanism 82 repositions the seating assembly 10, and the support mechanism 18 may provide vertical and lateral stability of the seating assembly 10 and may move the pawl assembly 34 between an unlocked position E and a locked position F. A force 270 (powered or manual) may be exerted on the cable 212 (FIG. 9B) to release the pawl assembly 34 from a locked position F to an unlocked position E when the seating assembly 10 is moved from the standing position III, to intermediate positions II, and to a sitting position I. Also, a lift mechanism release (powered or manual) may be activated to reposition the lift mechanism 82 from a standing position III, to intermediate positions II, and to a sitting position I.

Figure 4:
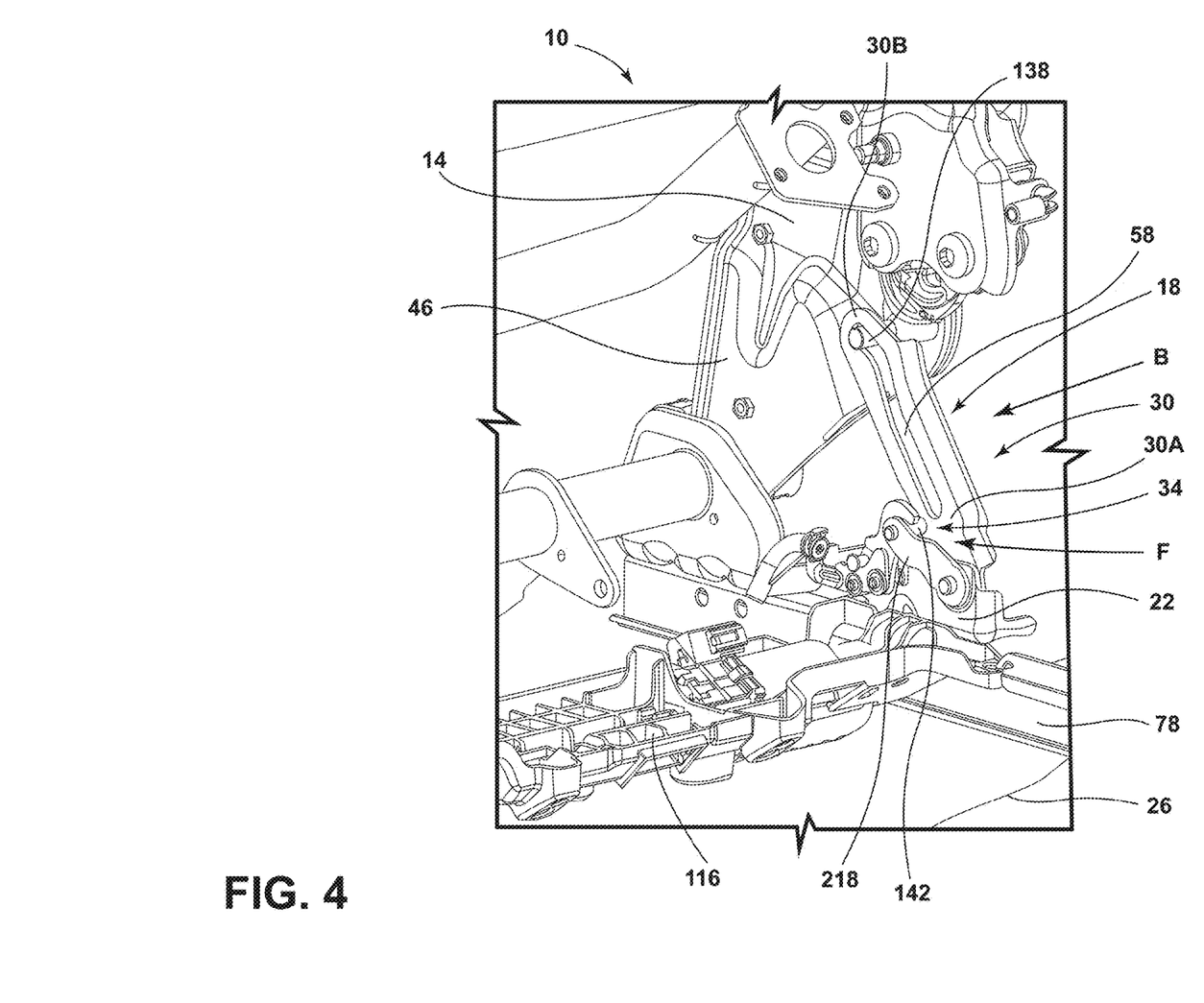
FIG. 4 is a left side perspective view of the support mechanism of FIG. 1 in the extended position.
Figure 5:
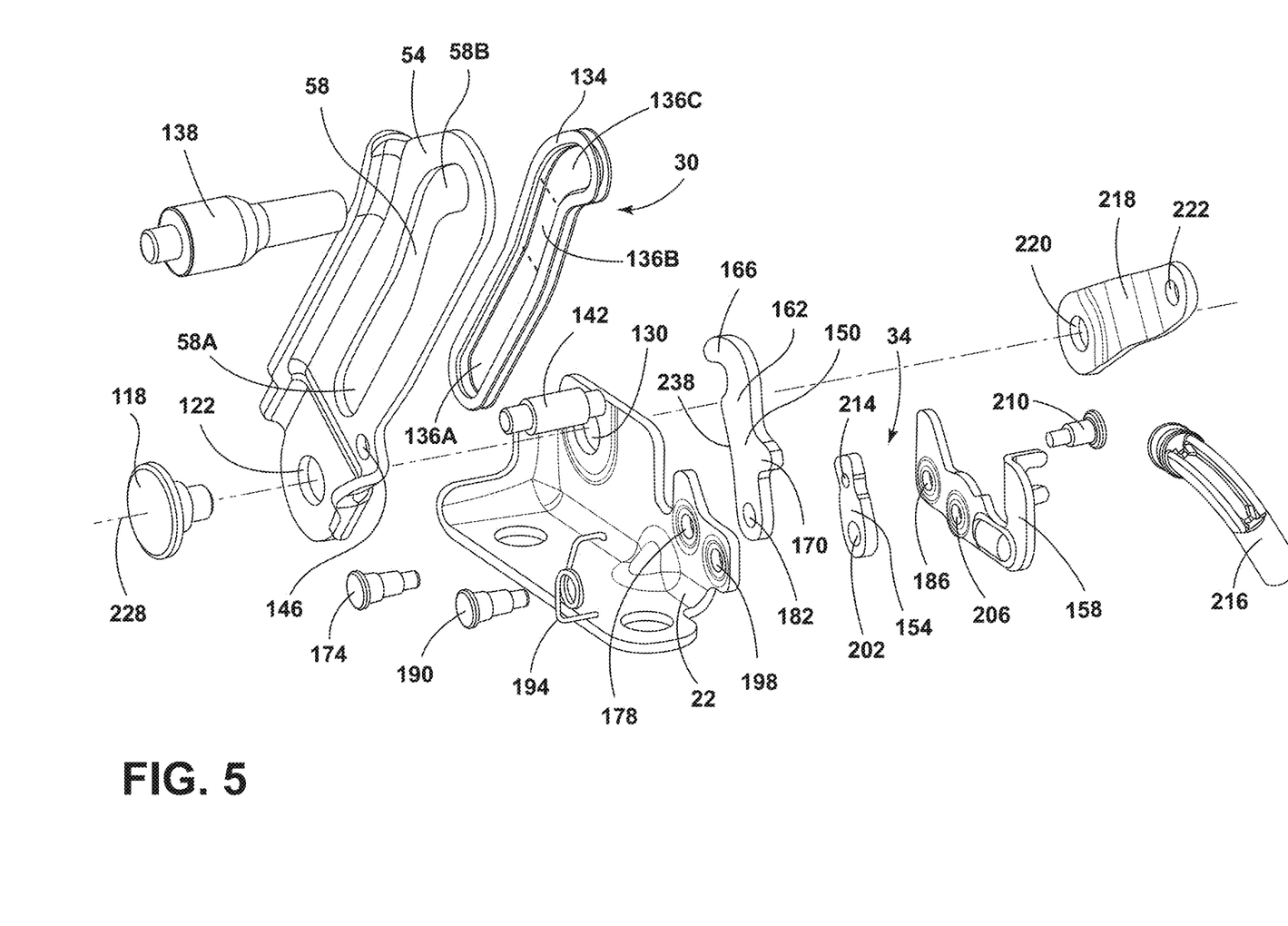
FIG. 5 is an exploded view of the support mechanism.

With reference to FIGS. 4 and 5, the support mechanism 18 may include a support bracket 22 coupled to the vehicle floor 26, a linkage assembly 30, and a pawl assembly 34. The linkage assembly 30 may be coupled to the support bracket 22. The pawl assembly 34 may be coupled to the support bracket 22 and the linkage assembly 30. The support bracket 22 may be mounted to the cross bar 116 extending between opposing sides of a seat frame 14. Fasteners may extend through holes in the support bracket 22 to mount the support bracket 22 to the cross bar 116. The cross bar 116 may be mounted to the rails 78 or another structure. The cross bar 116 may include a power source for the seating assembly 10.

With continuing reference to FIGS. 4 and 5, the linkage assembly 30 may be mounted to the support bracket 22 with a link pin 118 that may extend through a hole 122 in the link arm 54 and a hole 130 in the support bracket 22. The linkage assembly 30 may include a link arm 54 and a bushing 134. The bushing 134 may be inserted into a slot 58 in the link arm 54. The bushing 134 and the slot 58 may have a similar shape. The bushing 134 may be a nor-glide material. NOR-GLIDE® may refer to a composite material of compounded PTFE, bronze stretched metal, and steel backing. PTFE may refer to Polytetrafluoroethylene, which is a synthetic fluoropolymer of tetrafluoroethylene with a multitude of uses. The bushing 134 may receive a drive pin 138 that may be coupled to a side bracket 46 of a seat frame 14.

As shown in FIG. 5, the slot 58 and the bushing 134 may have a substantially straight portion 136A, a substantially diagonal portion 136B, and a substantially curved portion 136C. The substantially straight portion 136A may start at the end 58A of the slot 58. The substantially diagonal portion 136B may extend between the substantially straight portion 136A of the slot 58 and the substantially curved portion 136C of the slot 58. The substantially curved portion 136C of the slot 58 may accommodate the drive pin 138 and give the drive pin 138 a resting spot when the linkage assembly 30 is in the extended position C. In the example shown, the discussion of substantially straight portion 136A, substantially diagonal portion 136B, and substantially curved portion 136C of the slot 58 may also be applicable to the bushing 134 because, in the example shown, the bushing 134 and the slot 58 have a similar interior shape.

In the example shown in FIGS. 1-16C, the seat frame 14 may include opposing side brackets 46, 50. The drive pin 138 may extend from the right side bracket 46 and may be slidably coupled to the slot 58 (including bushing 134) of the link arm 54. The link arm-pawl pin 142 may extend through the hole 146 in the link arm 54 and may be positioned for engagement with the pawl assembly 34. The link arm-pawl pin 142 may be referred to as a protrusion that may extend from the right side bracket 46.

Referring again to FIGS. 4-5, a pawl assembly 34 may be mounted to the support bracket 22 and the linkage assembly 30. The pawl assembly 34 may include the pawl 150, the cam 154, and the cover plate 158. The pawl 150 may be secured to the support bracket 22 and the cover plate 158 with the pawl pin 174. The pawl pin 174 may extend through the hole 178 in the support bracket 22, the hole 182 in the pawl 150, and the hole 186 in the cover plate 158. The cam 154 may be secured to the support bracket 22 with the cam pin 190. The cam pin 190 may extend through the cam return spring 194, the hole 198 in the support bracket 22, the hole 202 in the cam 154, and the cover plate 158.

With further reference to FIGS. 4-5, cable pin 210 may extend into a hole 214 in the cam 154. The cable pin 210 may be coupled to a cable 212 that may be activated to move the cable pin 210 in and out of the hole 214 in the cam 154 to move the cam 154 between the locked position F and the unlocked position E. The cable 212 may extend from the cable guide 216. The term cable assembly may be used to describe the cable pin 210, the cable 212, the hole 214 in the cam 154 for the cable pin 210, and the cable guide 216. One example of a release mechanism for moving the pawl assembly 34 from a locked position F to an unlocked position E may be the cable assembly.

With continued reference to FIGS. 4-5, a doubler link 218 may extend from the link arm-pawl pin 142 to the link pin 118. The link pin 118 may extend into the hole 220 in the doubler link 218. The link arm-pawl pin 142 may extend into the hole 222 in the doubler link 218. The link arm 54 may rotate around an axis 228 extending through the link pin 118.

Figure 6A:
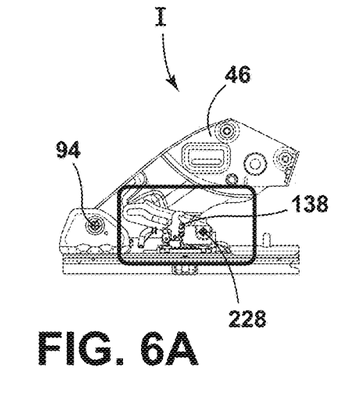
FIG. 6A is a left side elevational view of the support mechanism in the collapsed position in a step of the sitting to standing sequence.
Figure 6B:
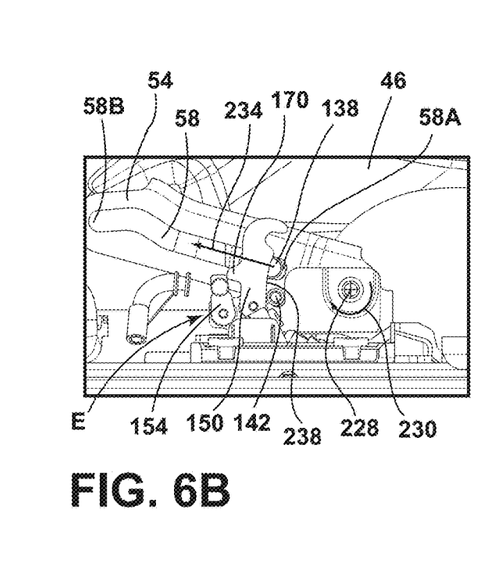
FIG. 6B is an exploded view of the support mechanism in the collapsed position of FIG. 6A.

FIGS. 6A to 8B show a sequence of the movement of the side bracket between a sitting position I and a standing position III and the corresponding sequence of movement of the support mechanism 18 from the collapsed position A to the extended position C. Referring to FIGS. 6A and 6B, the side bracket 46 is shown in the sitting position I, and the support mechanism 18 is shown in the collapsed position A. Upon application of a force to the side bracket 46 that causes a rotation of the side bracket 46 around the axis 228 in the counterclockwise direction shown by arrow 230, the drive pin 138 that extends from the side bracket 46 and that is disposed in the slot 58 in the link arm 54 is moved away from the end 58A of the slot 58 in the direction shown by arrow 234. The motion of the drive pin 138 along the slot 58 in the direction shown by arrow 234 may cause the link arm 54 to rotate about an axis 228 in a direction shown by arrow 230. The pawl assembly 34 may remain in the unlocked position E. In the unlocked position E of the pawl assembly 34, a link arm-pawl pin 142 extending from the link arm 54 may slide along an edge 238 of the pawl 150. In the unlocked position E, the nub 170 extending from the pawl 150 may abut the spring-loaded cam 154 to maintain the spring-loaded cam 154 in the unlocked position E.

Figure 7A:
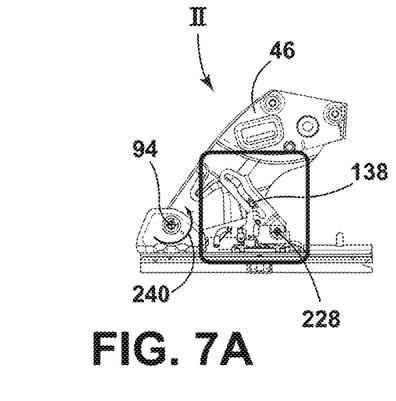
FIG. 7A is a left side elevational view of the support mechanism in the intermediate position in a step of the sitting to standing sequence.
Figure 7B:
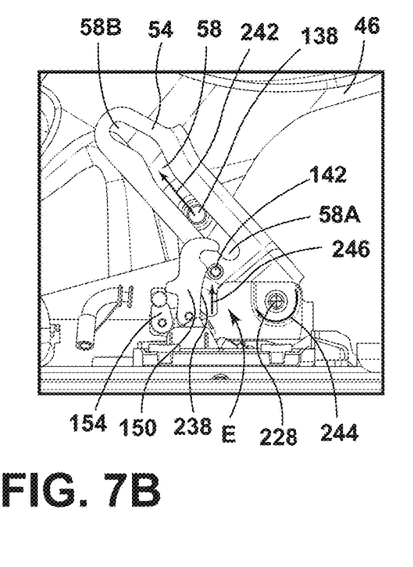
FIG. 7B is an exploded view of the support mechanism in the intermediate position of FIG. 7A.

Referring now to FIGS. 7A and 7B, the side bracket 46 is shown in an intermediate position II, and the support mechanism 18 is shown in an intermediate position II. The pawl assembly 34 is in the unlocked position E. As the side bracket 46 continues to rotate around the axis 94 in the direction shown by arrow 240, the drive pin 138 continues to move along slot 58. Movement of the drive pin 138 along the slot 58 in the direction shown by arrow 242 continues to cause the link arm 54 to rotate around axis 228 in the direction shown by arrow 242. The link arm-pawl pin 142 extending from the link arm 54 continues to move along the edge 238 of the pawl 150 in the direction shown by arrow 246. Arrow 268 shows the link arm-pawl pin 142 moving into the hook 166 of the pawl 150.

Figure 8A:
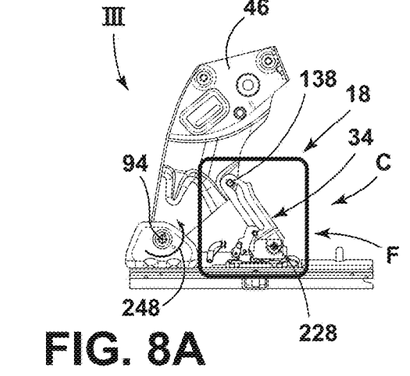
FIG. 8A is a left side elevational view of the support mechanism in the extended position in a step of the sitting to standing sequence.
Figure 8B:
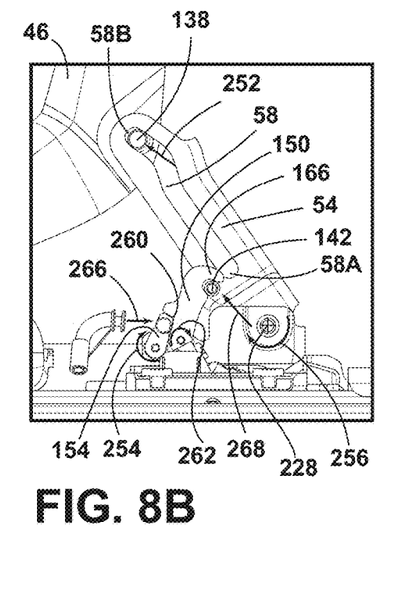
FIG. 8B is an exploded view of the support mechanism in the extended position of FIG. 8A.

Referring now to FIGS. 8A and 8B, the side bracket 46 is shown in the standing position III, and the support mechanism 18 is shown in the extended position C. The pawl assembly 34 is shown in the locked position F. The side bracket 46 has rotated around the axis 94 in the direction shown by arrow 248 until the drive pin 138 has been moved to the second end 58B of the slot 58. The drive pin 138 moves along the slot 58 in the direction shown by arrow 252. The link arm 54 rotates about the axis 228 in the direction shown by arrow 256 until the drive pin 138 reaches the second end 58B of the slot 58. The link arm-pawl pin 142 of the link arm 54 moves into the hook 166. The spring-loaded cam 154 rotates around the cam axis 250 in the direction shown by arrow 254. In response to the rotational movement of the cam 154 around the cam axis 250 in the direction shown by arrow 254 and the movement of the cam 154 into the recess 232, the pawl 150 rotates around the pawl axis 258 in the direction shown by arrow 262. Arrow 266 shows the movement of the cam 154 into the space below the nub 170. As such, the pawl assembly 34 moves into a locked position F to maintain the link arm-pawl pin 142 in the extended position C.

With continued reference to FIGS. 8A and 8B, due to the link arm 54 being maintained in the extended position C by the locked cam 154, support is provided to the lift mechanism 82 on the opposing left side of the seating assembly 10. The seating assembly 10 in the standing position III may be supported on both left and right sides by the respective lift mechanism 82 (left side) and the support mechanism 18 (right side). The support mechanism 18 in the extended position C with the pawl assembly 34 in the locked position F may provide stability to the seating assembly 10. Additionally, the support mechanism 18 in the extended position C with the pawl assembly 34 in the locked position F may minimize vibrations and noise of the seating assembly 10 while the vehicle is stationary, while the vehicle is moving, and while the seating assembly 10 is moved fore and aft along the track assembly 74 in the vehicle.

Figure 9A:
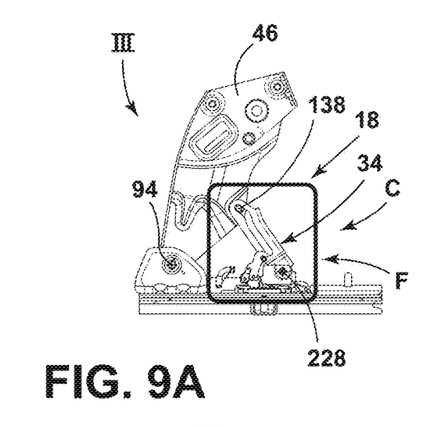
FIG. 9A is a left side elevational view of the support mechanism in the extended position in step of the standing to sitting sequence.
Figure 9B:
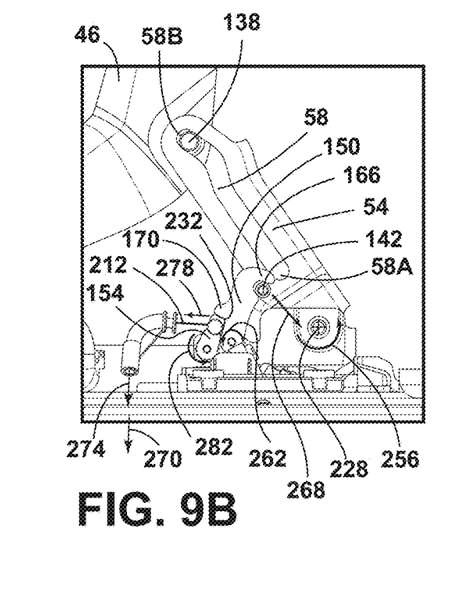
FIG. 9B is an exploded view of the support mechanism in the extended position of FIG. 9A.

FIGS. 9A-11B show a sequence of the movement of the side bracket 46 between a standing position III and a sitting position I and the corresponding sequence of movement of the support mechanism 18 from the extended position C to the collapsed position A. Referring to FIGS. 9A and 9B, the side bracket 46 is shown in the standing position III, and the support mechanism 18 is shown in the extended position C. The pawl 150 may be disposed around the link arm-pawl pin 142. The pawl assembly 34 in the locked position F may exert a downward force in the direction of arrow 268. To place the pawl assembly 34 in the unlocked position E, the cam 154 may be displaced from the recess 232 below the nub 170. A force 270 may be exerted on the cable guide 216 to remove the cam 154 from the recess 232. The force 270 may be applied to the cable 212 in the direction shown by arrows 274 and 278. The arrow 282 shows the direction in which the cam 154 may rotate about the cam axis 250 to move away from the pawl 150. Rotation shown by arrow 256 may occur around axis 258 when the pawl assembly 34 moves to the unlocked position E.

Figure 10A:
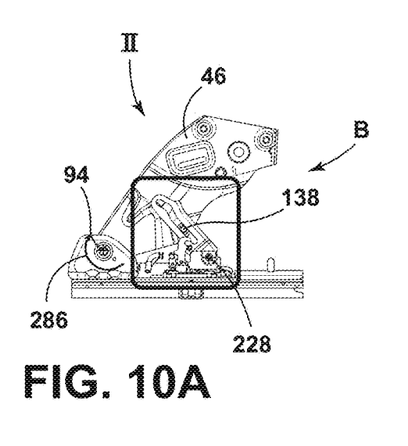
FIG. 10A is a left side elevational view of the support mechanism in the intermediate position in a step of the standing to sitting sequence.
Figure 10B:
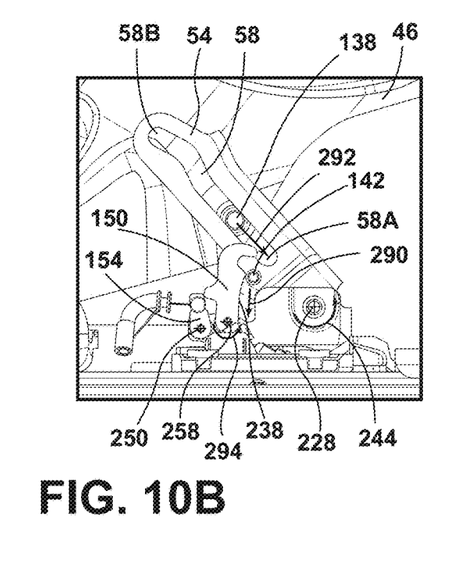
FIG. 10B is an exploded view of the support mechanism in the intermediate position of FIG. 10A.

Referring now to FIGS. 10A and 10B, the side bracket 46 and the support mechanism 18 are shown in the intermediate position II. The side bracket 46 is rotated about the axis 94 in the direction shown by arrow 286. The side bracket 46 moves downward toward the sitting position I, and the drive pin 138 extending from the side bracket 46 moves along the slot 58 in the direction shown by arrow 292 toward the end 58A of the slot 58. As the link arm 54 moves downward, the link arm-pawl pin 142 moves along an edge 238 of the pawl 150 in the direction shown by arrow 290, and the pawl 150 rotates around the pawl axis 258 in the direction shown by arrow 294. The pawl assembly 34 is in the unlocked position E.

Figure 11A:
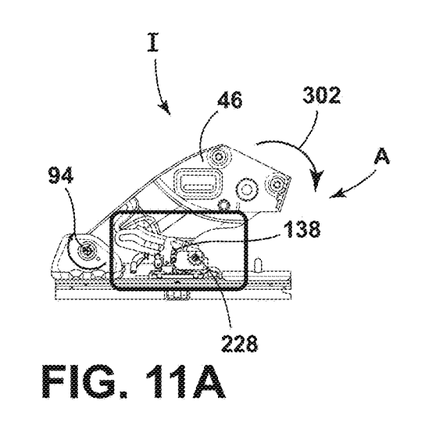
FIG. 11A is a left side elevational view of the support mechanism in the collapsed position in a step of the standing to sitting sequence.
Figure 11B:
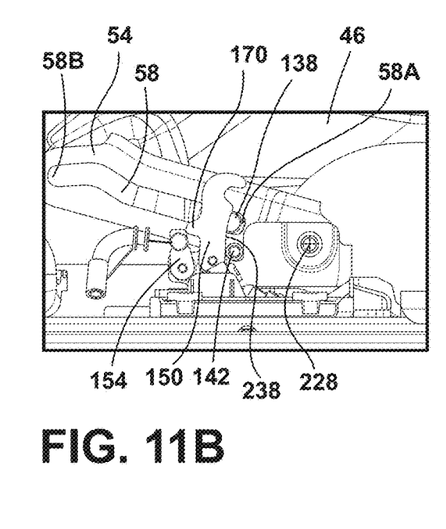
FIG. 11B is an exploded view of the support mechanism in the collapsed position of FIG. 11A.

Referring now to FIGS. 11A and 11B, the side bracket 46 is shown in the sitting position I, and the support mechanism 18 is shown in the collapsed position A. The drive pin 138 is disposed in the end 58A of the slot 58. The pawl 150 and the cam 154 form an interference fit. The cam 154 abuts the nub 170 of the pawl 150. The movements of the side bracket 46 around the axis 94 are shown by the rotational arrow 298.

Figure 12:
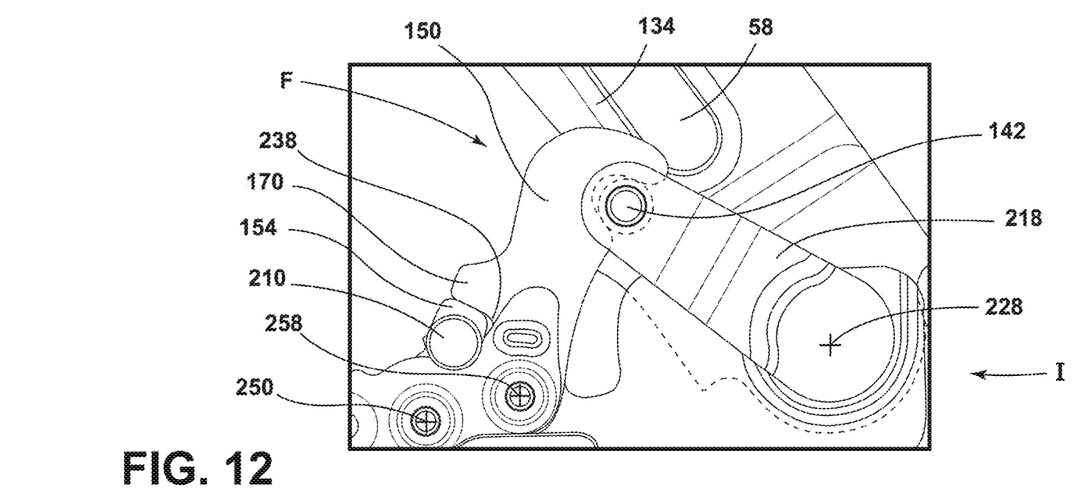
FIG. 12 is a left side elevational view of the pawl assembly in a locked position.
Figure 13:
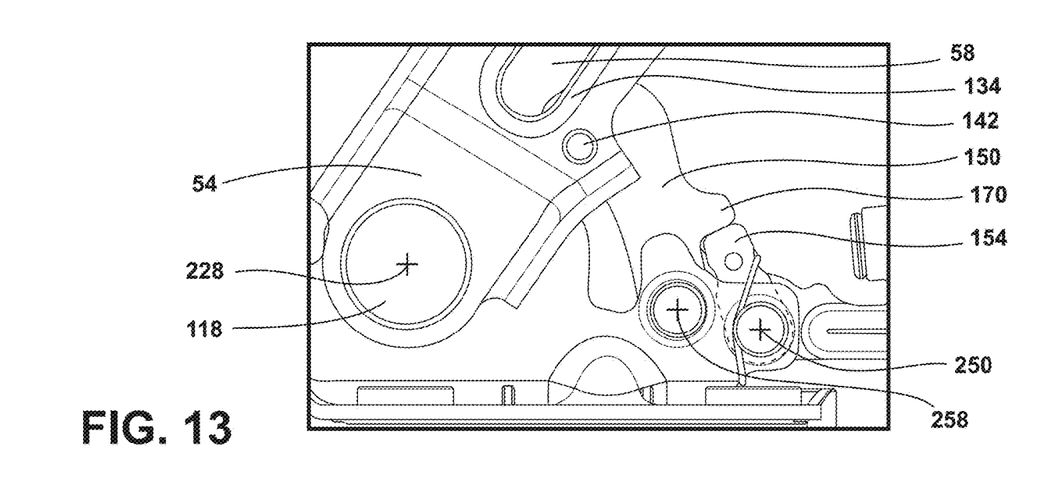
FIG. 13 is a right side elevational view of the pawl assembly in a locked position.

Referring to FIGS. 12 and 13, the support mechanism 18 is shown in the standing position III with the pawl assembly 34 in the locked position F. The cam 154 is shown in the recess 232 in the pawl 150. The seating assembly 10 is in the standing position III.

Referring to FIG. 13, a right side view of the support mechanism 18 is shown. The seating assembly 10 is in the standing position III. The pawl assembly 34 is in the locked position F.

Figure 14:
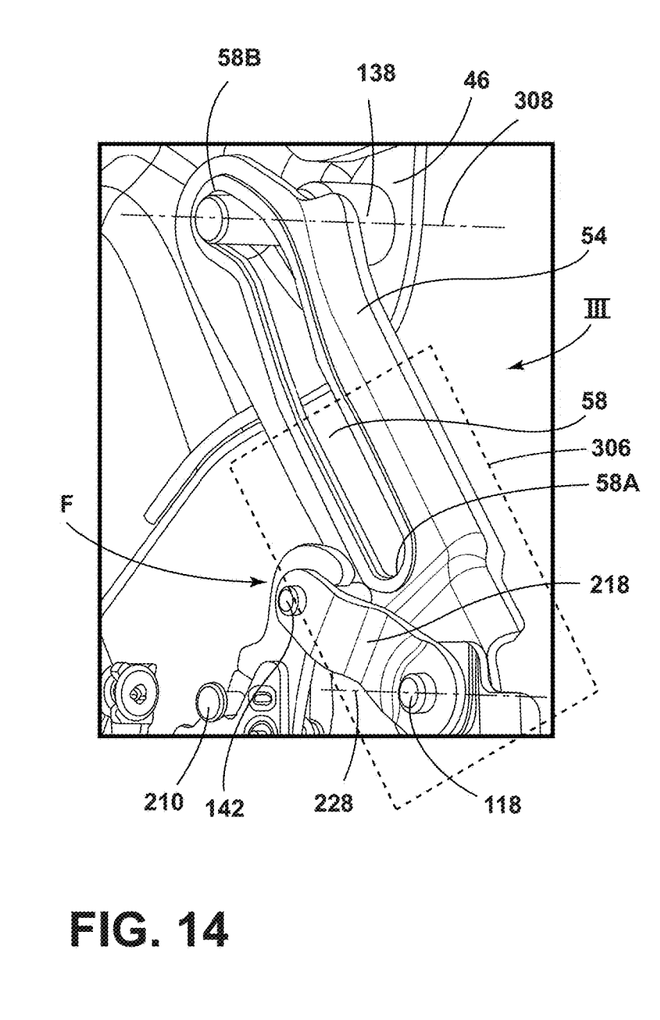
FIG. 14 is a left side perspective view of the link arm and the drive pin of the support mechanism in the extended position and the pawl assembly in the locked position.
Figure 15:
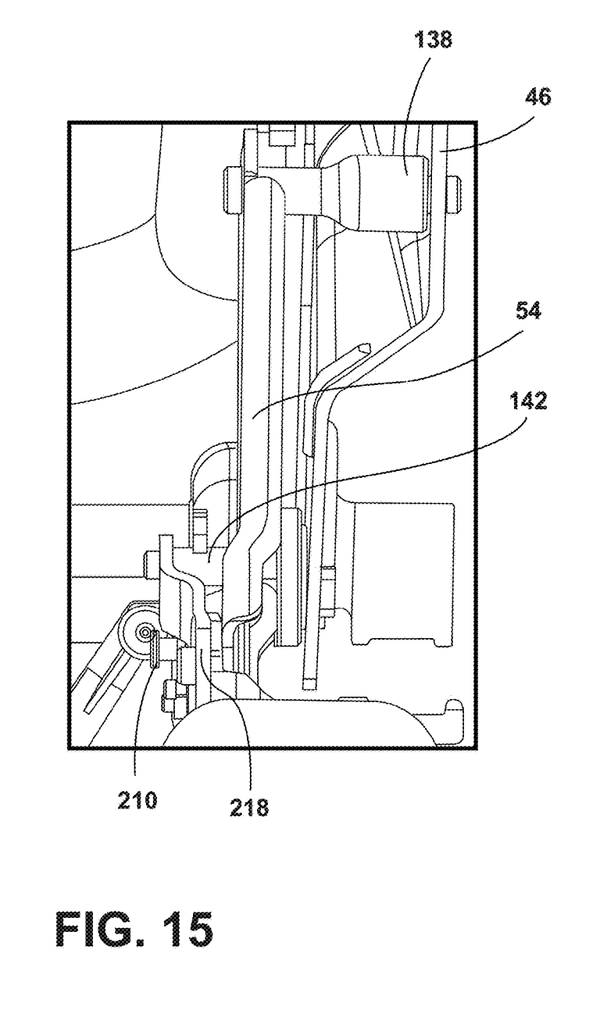
FIG. 15 is a rear view of the link arm and the drive pin with the support mechanism in the extended position and the pawl assembly in the locked position.

Referring to FIGS. 14 and 15, the seating assembly 10 is shown in the standing position III with the pawl assembly 34 in the locked position F. The drive pin 138 is shown in the second end 58B of the slot 58. The link arm 54 may extend along a plane 306 transverse to the axis 228. The drive pin 138 may extend along a line 308 substantially parallel to axis 228.

Figure 16A:
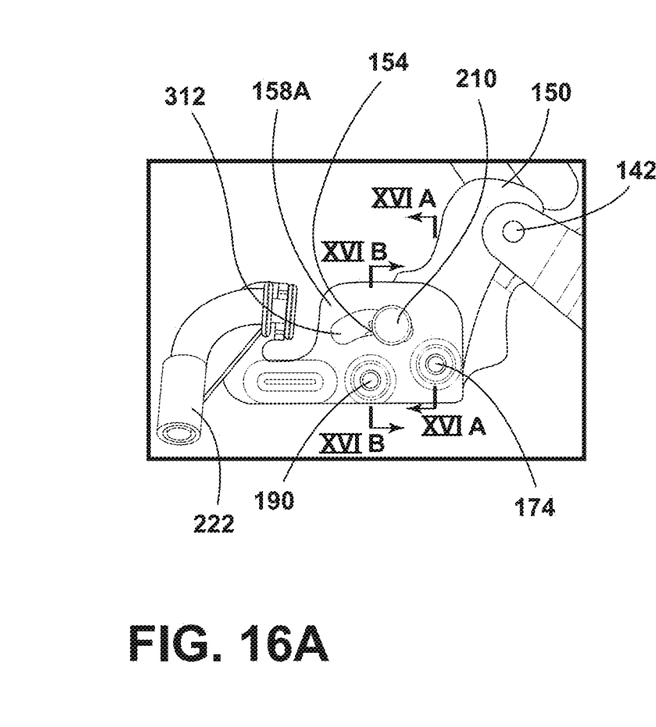
FIG. 16A is left side elevational view of an alternate embodiment of the cover plate, according to an embodiment of the disclosure.
Figure 16B:
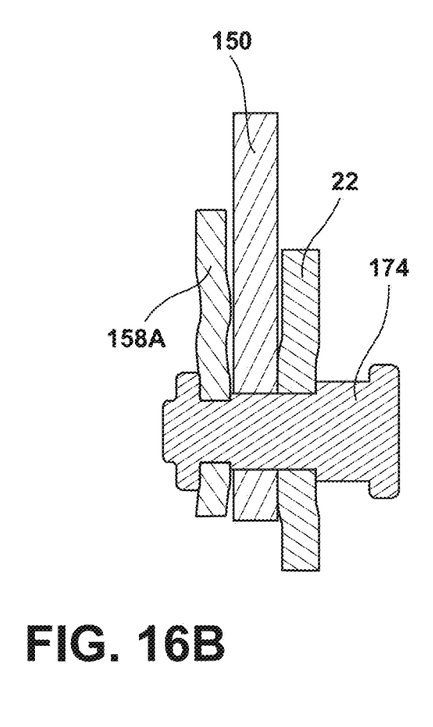
FIG. 16B is a cross-sectional view of an alternate embodiment of the cover plate and cam pin taken along line XVIB-XVIB of FIG. 16A.
Figure 16C:
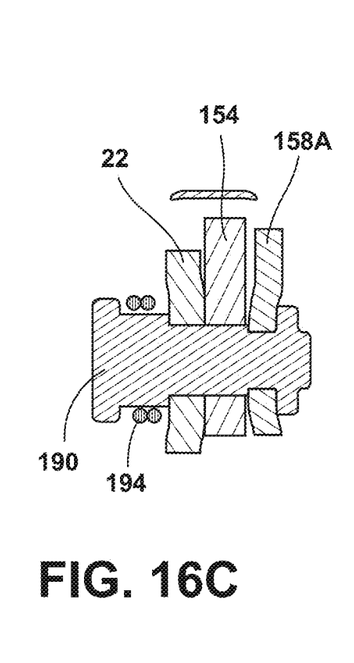
FIG. 16C is a cross-sectional view of an alternate embodiment of the cover plate and pawl pin taken along line XVIC-XVIC of FIG. 16A.

Referring to FIGS. 16A-16C, an alternate embodiment of the cover plate 158 is shown. The cover plate 158A may include a guide channel 312 for the cable pin 210.

A variety of advantages may be achieved by use of the present disclosure. The support mechanism 18 may stabilize the seating assembly 10 when the seating assembly 10 is stationary and when the vehicle is moving. While the vehicle is moving, use of the support mechanism 18 with the seating assembly 10 in the standing position III may help to minimize NVH (Noise Vibration Harshness) associated with the seating assembly 10. Additionally, as the seating assembly 10 in the standing position III is moved along the track assembly 74, the support mechanism 18 may help to stabilize the seating assembly 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A support mechanism for a vehicle seating assembly comprising:
   a seat frame movable between a sitting position and a standing position;
   a support bracket coupled to a vehicle floor; and
   a linkage assembly extending between the support bracket and the seat frame, positionable between a collapsed position if the seat frame is in the sitting position and an extended position if the seat frame is in the standing position, and including:
   a first end rotatably coupled to the support bracket;
   a second end slidably coupled to the seat frame; and
   a pawl assembly engageable with the linkage assembly and positionable in an unlocked position if the linkage assembly is in the collapsed position and a locked position if the linkage assembly is in the extended position, wherein the vehicle seating assembly includes a lift mechanism coupled to the vehicle floor and the seat frame and disposed on an opposing side of the vehicle seating assembly from the support mechanism, wherein the lift mechanism is configured to move the seat frame between the sitting position and the standing position, wherein the second end of the linkage assembly slidably coupled to the seat frame includes a link arm, a slot, and a drive pin, and wherein the slot is disposed in the link arm wherein the drive pin extends from the seat frame.

2. The support mechanism for a vehicle seating assembly of claim 1, wherein if the linkage assembly is in the collapsed position, then the drive pin is disposed in the first end of the slot, and wherein if the linkage assembly is in the extended position, then the drive pin is disposed in the second end of the slot.

3. The support mechanism for a vehicle seating assembly of claim 2, wherein the pawl assembly comprises a pawl and a cam.

4. The support mechanism for a vehicle seating assembly of claim 3, wherein the pawl assembly further comprises a cover plate that secures the pawl and the cam to the support bracket such that the support bracket is disposed between the link arm and the cover plate.

5. The support mechanism for a vehicle seating assembly of claim 4, wherein the pawl includes an oblong portion having a hook and a nub, wherein the link arm includes a protrusion, wherein the protrusion is positioned along an edge of the oblong portion if the linkage assembly is in the collapsed position or an intermediate position between the collapsed position and the extended position.

6. The support mechanism for a vehicle seating assembly of claim 5, wherein the protrusion is positioned in the hook if the linkage assembly is in the extended position.

7. The support mechanism for a vehicle seating assembly of claim 6, wherein the cam is spring-loaded so that when the protrusion is positioned in the hook, the cam abuts the nub in a locked position to maintain the protrusion in the hook.

8. The support mechanism for a vehicle seating assembly of claim 7, further comprising:
   a release mechanism coupled to the cover plate, wherein the release mechanism exerts a force on a cable pin extending into the cam to release the cam from the locked position.

9. The support mechanism for a vehicle seating assembly of claim 8, wherein the release mechanism may be activated simultaneously with a lift mechanism release to move the seating assembly from the standing position to the sitting position.

10. The support mechanism for a vehicle seating assembly of claim 1, wherein the support mechanism and the lift mechanism are coupled to rails disposed in a track assembly disposed in a vehicle floor so that the vehicle seating assembly in the standing position is slidable along the track assembly.

11. A vehicle seating assembly comprising:
   a mounting bracket coupled to a vehicle floor;
   a side bracket coupled to the mounting bracket at a first pivotable coupling defined by a first axis and rotatable about the first pivotable coupling between a sitting position and a standing position;
   a support bracket coupled to the vehicle floor;
   a linkage assembly coupled to the support bracket at a second pivotable coupling defined by a second axis, extending between the support bracket and the side bracket, slidably coupled to the side bracket, and movable between a collapsed position if the side bracket is in the sitting position and an extended position if the side bracket is in the standing position; and a pawl assembly coupled to the support bracket, engageable with the linkage assembly, and positionable in an unlocked position when the linkage assembly is in the collapsed position and a locked position when the linkage assembly is in the extended position, wherein the linkage assembly includes a link arm having a slot and a drive pin extending from the side bracket and positionable in the slot, wherein the drive pin is disposed at a first end of the slot when the linkage assembly is in the collapsed position, and wherein the drive pin is disposed in second end of the slot when the linkage assemble is in the extended position.

12. The vehicle seating assembly of claim 11, wherein the side bracket includes a first side bracket and further comprising:

a second side bracket rotatably coupled to a mounting bracket, wherein a lift mechanism is activated to rotate the second side bracket about the first axis to move the second side bracket between the sitting position and the standing position.

13. The vehicle seating assembly of claim 12, further comprising:

a release mechanism, wherein an exertion of force by the release mechanism on the pawl assembly releases a cam from the locked position.

14. The vehicle seating assembly of claim 11, wherein the link arm extends along a plane transverse to the second axis and wherein the drive pin extends along a line substantially parallel to the second axis.

15. A vehicle seating assembly comprising:

a seat frame including:

opposing first and second side brackets;

a cross member extending between the first and second side brackets and defining a first axis about which the first and second side brackets rotate between a sitting position to a standing position;

a lift mechanism coupled to one of the first and second side brackets and configured to rotate the seat frame around the first axis and between the sitting position and the standing position; and a support mechanism coupled to the other of the first and second brackets and arrangeable in an extended position when the seat frame is in the standing position, wherein the support mechanism includes a pawl assembly disposed in a locked position to maintain the support mechanism in the extended position.

\* \* \* \* \*